US005509212A

United States Patent [19]

Henricksen

[11] Patent Number: 5,509,212

[45] Date of Patent: Apr. 23, 1996

[54] FOLDING AND LOCKING DRAFTING AID APPARATUS AND METHOD

[76] Inventor: Douglas A. Henricksen, 9156 Bedford Dr., Boca Raton, Fla. 33434

[21] Appl. No.: 304,778

[22] Filed: Sep. 12, 1994

[51] Int. Cl.$^{6}$ .................................................. G01B 3/06

[52] U.S. Cl. ................................ 33/565; 33/500; 33/483; 33/465; 24/543

[58] Field of Search ............................. 33/565, 452, 465, 33/467, 483, 495, 496, 497, 500, 478, 562, 563, 564, 566; 70/142; 292/307 R, 307 A, 307 B, 318, 319, 320, 321, 322, 325; 24/543, 487, 518

[56] References Cited

U.S. PATENT DOCUMENTS

| | | | |
|---|---|---|---|
| 827,932 | 8/1906 | Morehouse | 33/465 |
| 2,151,467 | 3/1939 | Harsin | 33/465 |
| 2,371,485 | 3/1945 | Waldman | 33/565 |
| 4,887,335 | 12/1989 | Folkmar | 24/543 |
| 5,307,543 | 5/1994 | Krillenberger | 24/543 |

FOREIGN PATENT DOCUMENTS

| | | | |
|---|---|---|---|
| 2250959 | 6/1992 | United Kingdom | 33/483 |

*Primary Examiner*—Christopher W. Fulton
*Attorney, Agent, or Firm*—Robert J. Van Der Wall

[57] ABSTRACT

A folding drafting aid apparatus includes a planar member having a first and second planar member ends and a first planar member side and a second planar member side, and being foldable at a hinge structure so that the second planar member side pivots face to face against itself; a flexible, resilient first tab having a free end and retained on a first tab structure; and a flexible, resilient second tab having a tab free end and retained on a second tab structure; where the tabs are positioned relative to each other so that when the planar member is folded at the hinge structure to pivot the second planar member side face to face against itself, one tab overlays the other tab and so that pressing one tab against the other tab causes both tabs to bend until the free end of the one tab crosses over the free end of the other tab and remains in this crossed-over position to hold the planar member in the folded position.

14 Claims, 3 Drawing Sheets

FIG. I

FOLDING AND LOCKING DRAFTING AID APPARATUS AND METHOD

BACKGROUND OF THE INVENTION

1. Field of the Invention

The present invention relates generally to the field of template devices that may include a variety of shapes, letters, numbers, and/or symbols, and measuring devices which fold for compact carrying and storage. More specifically it relates to a folding and latching drafting aid including an elongate planar member in the form of a ruler and template of hard, flexible and resilient material having a first side and a second side and two planar member ends, a central hinge structure about which the drafting aid folds and a latch structure which selectively locks the planar member ends together. The central hinge structure is preferably a molded groove extending laterally across the first side of the planar member which serves as a living hinge that avoids material fatigue and thus permits the planar member to fold as a result of its narrow cross-section so that the second side of the planar member is brought face to face against itself. The latch structure preferably includes first and second latch ports cut out of the planar member ends which are positioned so that the ports register with each other when the planar member is folded. Within the first latch port is a first locking tab protruding from the outer end of the port and toward the hinge. This locking tab is recessed from the first side of the planar member to be thinner and more flexible than the planar member. Within the second latch port is a second locking tab protruding from the inner end of the port and away from the hinge, and also recessed from the first side of the planar member for greater flexibility. When the planar member is folded, and the first and second ports register, the first and second locking tabs are overlapping and mutually parallel. To latch the drafting aid in the folded position, a method is provided wherein one tab is pressed against the other tab so that both tabs bend in the pressed direction and the pressed tab snaps over the other, retaining tab. The tabs remain in this crossed over, latching relationship and thereby hold the drafting aid folded until the pressed tab is pressed in the opposite direction through the opposing port to cause the pressed tab to snap back over the free end of the retaining tab so that the tabs no longer interlock. The pressed tab is preferably longer than the retaining tab for easier latching. It should be noted that the longer, pressed tab is easier to latch not only because it is longer than the shorter, retaining tab, but it is also parallel to the shorter retaining tab in the unlatched position. On the other hand, the longer, pressed tab is more difficult to unlatch than it is to latch because in the latched position, the two tabs are no longer parallel to each other, and thus the longer, pressed tab must travel a greater distance to reach the unlatched position, parallel to the retaining tab.

The planar member preferably has a series of template openings spaced axially along its length and cut into a variety of geometric shapes, such as a circle, a square and a triangle, to permit tracing of these shapes with a marking instrument. The longitudinal edges of the planar member may be used as guides to draw straight lines which are not interrupted crossing the living hinge. That is, a straight line may be drawn along the entire length of the drafting aid in its unfolded configuration. This drafting aid design permits drafting aid manufacture by single action molding.

2. Description of the Prior Art

There have long been templates and measuring devices which fold into a compact form for carrying and storage.

One such device is that of Greene, U.S. Pat. No. 2,555,741, issued on Jun. 5, 1951. Greene teaches a collapsible ruler formed of a strip of fabric having a series of spaced apart stiff rib segments attached along its length. The rib segments cause the ruler to fold only at the spaces between the rib segments and thus to collapse in an accordion configuration for storage. A problem with Greene is that no provision is made to keep the folded ruler from accidently falling open or otherwise unfolding at the wrong moment. Another problem with Greene is that the fabric strip would not have sufficiently firm edges to permit drawing straight lines against the edges. Furthermore, the rib segments would obstruct any template shape openings which might be cut into the strip.

Libit, U.S. Pat. No. 4,987,685, issued on Jan. 29, 1991, discloses a foldable accounting guide. The Libit guide includes a panel marked with guide line markings and having a folding construction. The folding construction includes a hinge structure having a triangular component with angularly disposed hinge axes between a triangular connecting member and two end components. This arrangement permits the end components to be oriented in perpendicular relation, in overlapping relation, or in longitudinal relation. A problem with Libit is once again that no provision is made to hold the foldable guide in a folded configuration. Another problem is that the general shape is needlessly wide and awkward for use as a ruler.

Bilodeau, et al., U.S. Pat. No. 4,565,012, issued on Jan. 21, 1986, reveals a marking and measuring instrument. Bilodeau et al. includes a series of rectangular plates hingedly joined together sequentially along their longitudinal edges to form a composite panel. A cut extends through the plates at an angle across the composite panel and is spanned by hinge means. Bilodeau et al. is wrapped around cylindrical and other three-dimensional objects to provide perimetrical measurements of the outer surfaces of the objects. The composite panel may be provided with measuring indicia. A problem with Bilodeau et al. is that there is no provision for holding the apparatus in a folded configuration, and unwanted deployment is therefore likely. Another problem is that even if folded, Bilodeau et al. is bulky, and would be relatively expensive to manufacture.

Giroux, U.S. Pat. No. 4,203,227, issued on May 20, 1980, reveals a telescopic straight edge for use in construction. Giroux includes several elongate slat members joined together end to end so that their longitudinal edges lie in common parallel planes with all edges in a first or a second common plane. Conventional pin hinges join ends of several slat members together in series so that the apparatus can fold. Each outer slat member has a longitudinal dovetail groove which telescopingly receives a longitudinal dovetail rib on a sliding slat member sized to slidingly engage the groove. A problem with Giroux is that no provision is made to hold the straight edge in a folded configuration. Another problem is that Giroux would be relatively expensive to manufacture with its separately formed and attached hinges and its complex slat members.

Evans, U.S. Pat. No. 3,792,511, issued on Feb. 19, 1974, teaches a document clamp formed of a series of four slat members. The middle two slat members are inter-connected end to end by a hinge, and the outer two are connected to the middle two by pivot pins. Evans includes cooperative magnet elements at the outer ends of the middle and outer slat members which come face to face and magnetically engage when the slat members are hinged and laterally pivoted closed. In use, Evans folds around edges of blueprints and documents to hold them in place, and may include measuring indicia along its longitudinal edges. A problem with Evans is that the magnet elements could erase dictation tapes if by chance placed next to them on a desk. Another problem is that the manufacture and assembly of hinges and magnetic elements make Evans expensive.

Ferguson, U.S. Pat. No. 3,503,130, issued on Mar. 31, 1970, reveals a folding ruler. Ferguson includes two or more slat members connected end to end by hinges, parts of which are molded into the slat members themselves. Each slat member end has a series of laterally spaced apart, coaxial tube portions extending therefrom, which mesh with tube portions of an adjacent slat member when the slat members are fitted end to end so that the tube portion inner passageways align and permit the insertion of a hinge pin. A problem with Ferguson is that the formation of tube portions on the slat member ends would require expensive and complex molding or machining. Another problem is once again that no provision is made to hold the ruler in the folded position.

Quenot, U.S. Pat. No. 3,289,302, issued on Dec. 6, 1966, discloses a folding measuring instrument. Quenot includes rigid elongate elements pivotally secured endwise with rivets and marked with scales. A plastic spring is provided on the pivotal connection between any two successive elements, each spring including a male and a female section on opposing element faces, so that the springs removably snap over and engage each other when the elongate elements are folded face to face. A problem with Quenot is that these spring elements cannot be economically manufactured in a single action molding process.

It is thus an object of the present invention to provide a drafting aid apparatus which folds at a hinge structure into a flat, completely flush, compact configuration, and which easily and reliably latches in the folded configuration.

It is another object of the present invention to provide such an apparatus which provides longitudinal line tracing guide edges in its unfolded configuration which are not irregular at the hinge structure, which is useful in the folded configuration as well.

It is still another object of the present invention to provide such an apparatus which is sturdy and reliable, and which preferably provides template openings for tracing various shapes with a marking instrument.

It is finally an object of the present invention to provide such an apparatus which is relatively inexpensive to manufacture and which can specifically be manufactured with a single action molding process.

SUMMARY OF THE INVENTION

The present invention accomplishes the above-stated objectives, as well as others, as may be determined by a fair reading and interpretation of the entire specification.

A folding drafting aid apparatus is provided including a planar member having a first planar member end and a second planar member end and a first planar member side and a second planar member side, and being foldable at a hinge structure so that the second planar member side pivots face to face against itself. Included is a flexible, resilient first tab having a free end and retained on a first tab structure; and a flexible, resilient second tab having a tab free end and retained on a second tab structure. The tabs are positioned relative to each other so that when the planar member is folded at the hinge structure to pivot the second planar member side face to face against itself, one tab overlays the other tab end. Then pressing one tab against the other tab causes both tabs to bend until the free end of the one tab crosses over the free end of the other tab and they remain in this crossed-over position to hold the apparatus in the folded position. The first and second tab structures preferably include tab ports in the first and second planar member ends, respectively, the tab ports having port edges, and the tabs extending from the port edges. The tabs are preferably thinner than the planar member so that the tabs are more flexible than the planar member. One tab is preferably longer than the other tab. The apparatus optionally includes template openings in the planar member. The apparatus also optionally includes measuring indicia marked on the planar member, which may be formed of a plastic. The first tab is preferably directed away from the first planar member end and toward the hinge structure; and the second tab is preferably directed toward the second planar member end and away from the hinge structure.

A folding drafting aid apparatus is also provided including a planar member having a first planar member side and a second planar member side and being foldable at a hinge structure so that the second planar member side pivots face to face against itself; and the hinge structure includes a groove molded into the first planar member side substantially perpendicular to the longitudinal axis of the planar member, such as the elongate panel disclosed herein, to form a living hinge not subject to fatigue failure.

A method is provided of latching the ends of a folding drafting aid apparatus together with the apparatus recited first above, including, in summary form, the steps of folding the planar member at the hinge structure until the second planar member side is brought face to face against itself; and pressing one tab against the other tab, thereby bending both tabs until the free end of the one tab passes over the free end of the other tab, creating a cross-over of the tabs for holding the planar member in the folded position.

BRIEF DESCRIPTION OF THE DRAWINGS

Various other objects, advantages, and features of the invention will become apparent to those skilled in the art from the following discussion taken in conjunction with the following drawings, in which:

In FIG. 10, the longer tab is at the point of passing the shorter tab. FIG. 11 shows the configuration after the tabs have passed each other in the unlocked format.

DETAILED DESCRIPTION OF THE PREFERRED EMBODIMENT

Figure 1:
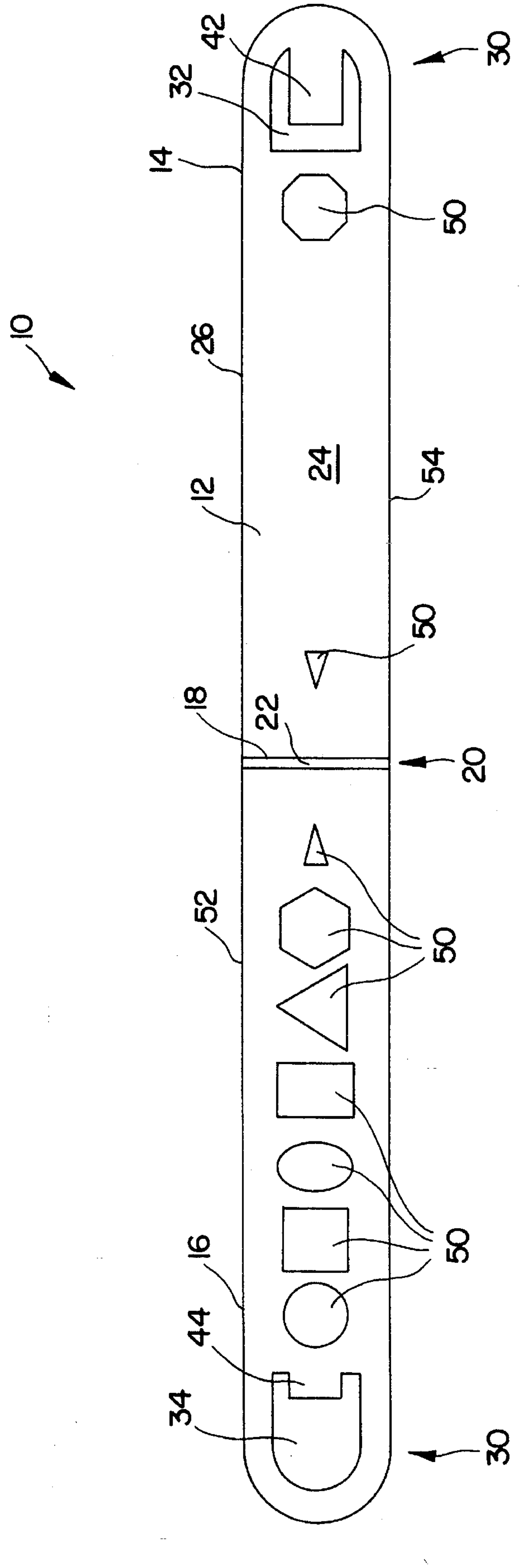
FIG. 1 is a top view of the inventive folding drafting aid apparatus which in this instance happens to be a ruler, showing the hinge grooves, the locking tabs in the latch ports, and an example of various sample geometrical template openings.

The detailed embodiment of the present invention is disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiment

Figure 2:
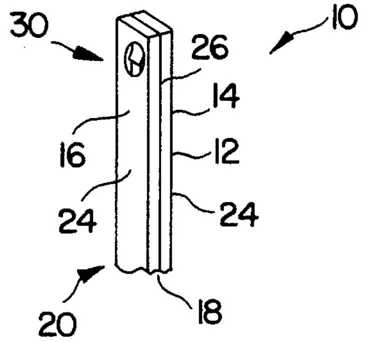
FIG. 2 is a perspective view of the drafting aid apparatus in the folded configuration.
Figure 3:
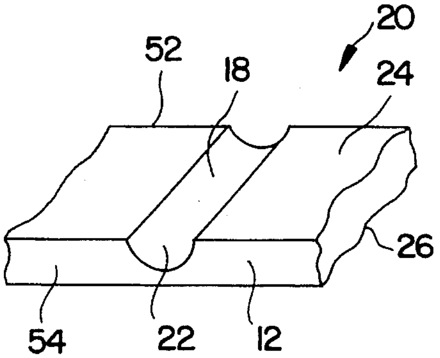
FIG. 3 is a close-up, cut away perspective view of the hinge groove.
Figure 4:
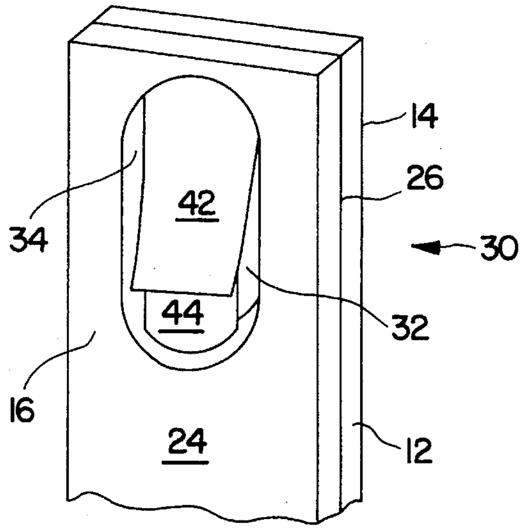
FIG. 4 is a close-up, cut away perspective view of the latching apparatus in the latched position.

Referring to FIGS. 1–12*a*, a folding and latching drafting aid apparatus 10 is disclosed. Apparatus 10 includes an elongate planar member 12 of hard, flexible and resilient material having first and second planar member ends 14 and 16, respectively, a central hinge structure 20 and a latch structure 30 which selectively locks planar member ends 14 and 16 together. See FIG. 2.

Central hinge structure 20 is preferably a living hinge 18 extending laterally across a first side 24 of planar member 12 which permits a second side 26 of planar member 12 to fold face to face against itself for compact storage configuration. The bottom walls 22 of double groove 18 are preferably complex curves. See FIG. 3. The radii which form this curve are determined in accordance with known methods of designing what is termed in the art as a living hinge. The use of these radii improves flow of the melt and reduces notch sensitivity in the area of the hinge. A radiused restriction ensures bending at the thinnest point on a straight line along the centerline of the web. The web will neck down the first time it is flexed. To ensure a good flex life, the hinge should be flexed several times immediately after being molded and while hot, since this flexure results in orientation of the web and consequent strength. Multiple planar member 12 folds and corresponding hinge structures 20 are also contemplated, any or all of which may be held closed with a corresponding latching structure 30.

Latch structure 30 preferably includes latch ports 32 and 34 cut out of planar member ends 14 and 16, respectively, which register with each other when planar member 12 is folded. Within first latch port 32 is a first locking tab 42 protruding from the remote edge of port 32 toward hinge structure 20. This locking tab 42 is recessed from the first side 24 of planar member 12. See FIG. 4. Within second latch port 34 is a second locking tab 44 protruding from the inner edge of port 34 away from hinge structure 20, and also recessed from the first side 24 of planar member 12. In other words, tabs 42 and 44 are each flush with second side 26 but are recessed from first side 24 to be thinner than planar member 12. See FIG. 5. When planar member 12 is folded, and the first and second ports 32 and 34 register, first and second locking tabs 42 and 44 are directly adjacent each other, overlap and are mutually parallel. Tabs 42 and 44 may be oriented in virtually any position as long as they overlap each other when planar member 12 is folded. Whether apparatus 10 is folded or unfolded, and whether latch structure 30 is locked or unlocked, latch structure 30 is always contained within with the rest of panel 12. This is a key inventive feature of apparatus 10, and facilitates printing, such as by silk screening, hot stamping, and pad printing.

Planar member 12 preferably has a series of template openings 50 along its length cut into a variety of shapes, such as a circle, a square, a triangle, a rectangle and a star to permit tracing of these shapes with a writing instrument. The longitudinal planar member edges 52 and 54 may be used as guides to draw straight lines.

This drafting aid design permits manufacture by single action molding. This is because the only recesses in planar member 12, specifically groove 18 and the recesses for making tabs 42 and 44 thinner than the rest of planar member 12, are all in first side 24. These recesses, as well as openings 50, can thus be formed by pouring plastic or other material into a single action mold having mold inserts.

A rectangular insert panel 60 is preferably removably retained within a correspondingly sized and shaped insert panel opening 62 in planar member 12. See FIG. 12. An insert panel 60 preferably snaps over ridges (not shown) at the edges of opening 62 for removable engagement and retention within opening 62. This insert panel 60 may display a logo for advertising purposes. An insert panel 60 may be provided which has open stencil portions, such as of the letters of the alphabet. See FIG. 12*a*. Insert panels 60 can be snapped out and replaced with other insert panels 60 for various drafting or advertising applications.

Method

Figure 5:
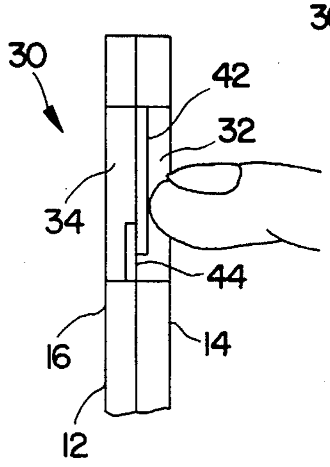
FIGS. 5–8 are a sequence of cross-sectional edge views of the ends of the drafting aid apparatus in the folded configuration, showing in FIG. 5 a finger beginning to press one tab toward the other to begin the locking action, in FIG. 6 the one tab pressing against the other so that both are flexing laterally, in FIG. 7 the one tab having snapped over the second tab, and in FIG. 8 the resulting tab locking position. Note that the latch structure is completely contained within with the panel, whether the apparatus is folded or unfolded, latched or unlatched.

In practicing the invention, the following method is used in latching and unlatching the drafting aid in its folded position. After folding planar member 12, to latch the drafting aid, longer tab 42 is pressed against shorter tab 44 so that both tabs bend in the pressed direction and longer tab 42 snaps over shorter tab 44, which acts as a retaining tab. More specifically, FIG. 5 illustrates the position of the tabs in the unlocked position as a finger begins to apply pressure on longer tab 42.

Figure 6:
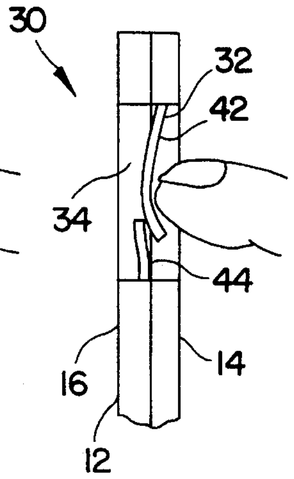
Figure 7:
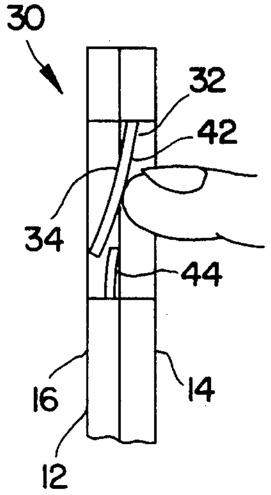
Figure 8:
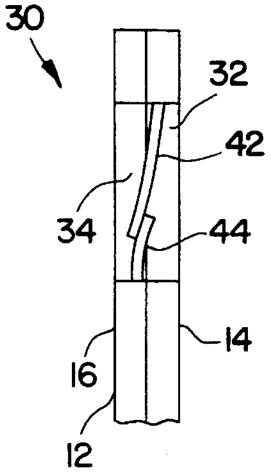

In FIG. 6 pressure has resulted in flexure of both longer tab 42 and shorter tab 44. In FIG. 7 the pressure has resulted in space for longer tab 42 to pass beyond the end of shorter tab 44. FIG. 8 shows the positions of the tabs in the locked position after the pressure has been relaxed and the tabs overlap each other in the opposite direction from which they were in FIG. 5. The tabs 42 and 44 remain in this crossed-over, latching position and thereby hold the apparatus 10 folded.

Figure 9:
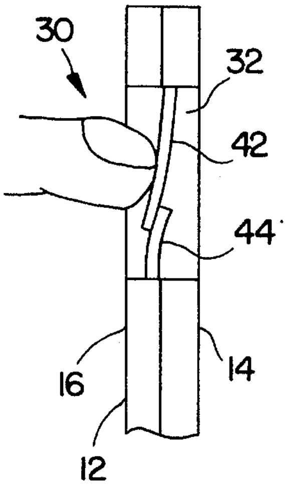
FIGS. 9–11 are a sequence of cross-sectional edge views of the drafting aid apparatus in the folded configuration, showing in FIG. 9 a finger beginning to press one tab toward the other to begin the unlocking action from the locked position shown in FIG. 8.
Figure 10:
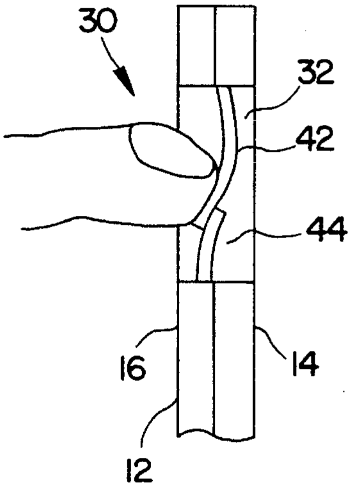
Figure 11:
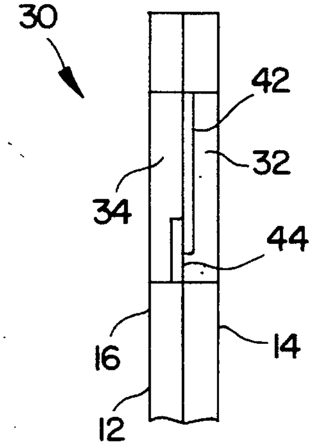
Figure 12A:
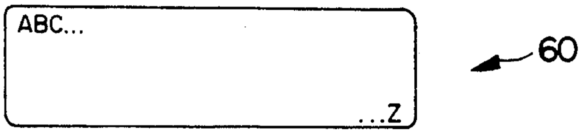
FIG. 12*a* shows a separate insert panel containing a stencil of the alphabet.
Figure 12:
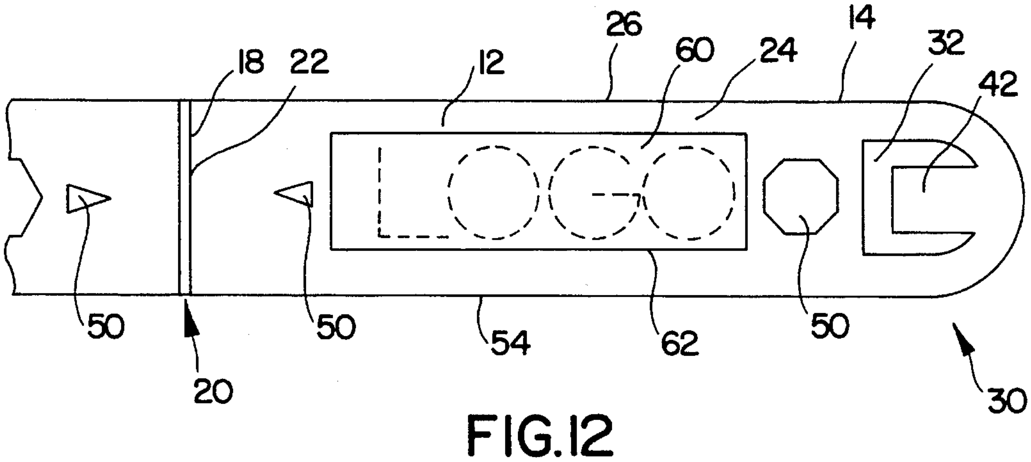
FIG. 12 is like FIG. 1 with an end of the apparatus broken away, except that a snap out insert panel is provided, which in this instance displays a logo.

To release apparatus 10 from the folded position, the latched structure 30 must be pressed from the opposite side. FIG. 9 shows pressure beginning to be applied to the opposite side of longer tab 42. FIG. 10 shows flexure, particularly of longer tab 42 to create room for the tabs to pass each other in the opposite direction from that shown in FIGS. 5–8. FIG. 11 illustrates the position of the tabs after unlatching has occurred. In simple terms, to release apparatus 10 from the folded position, the latching mechanism is pressed in the opposite direction through the opposing port to cause the longer tab 42 to snap back over the shorter retaining tab 44 so that the tabs no longer interlock. Alternatively planar member 12 is simply pulled open over the resistance caused by interlocking tabs 42 and 44, thereby separating tabs 42 and 44.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A folding latchable drawing aid apparatus, comprising:

a planar member having a first planar member end and a second planar member end and a first side and a second side, and being foldable at hinge means such that said second side pivots face to face against itself;

a flexible, resilient first tab having a free end and retained on a first tab structure, said first tab being substantially co-planar with said planar member;

and a flexible, resilient second tab having a tab free end and retained on a second tab structure, said second tab being substantially co-planar with said planar member;

wherein said tabs are positioned relative to each other such that when said strip is folded at said hinge means to pivot said second side face to face against itself, one said tab overlays the other said tab and such that pressing one said tab against the other said tab causes both tabs to bend until the free end of said one tab crosses over the free end of the other said tab and remains in this crossed-over position to hold said apparatus in the folded position.

2. The apparatus of claim 1, wherein said first and second tab structures comprise tab ports in said first and second ends, respectively, said tab ports having port edges, and wherein said tabs extend from said port edges.

3. The apparatus of claim 1, wherein said tabs are thinner than said planar member such that said tabs are more flexible than said planar member.

4. The apparatus of claim 3 wherein the said tabs are sufficiently thin that when crossed over each other the folded apparatus remains flush.

5. The apparatus of claim 4 that can be silk screened, hot stamped, and pad printed because it is flush.

6. The apparatus of claim 1, wherein said first tab is longer than said second tab.

7. The apparatus of claim 1, additionally comprising template openings in said planar member.

8. The apparatus of claim 1, additionally comprising measuring indicia marked on said planar member.

9. The apparatus of claim 1, wherein said planar member is formed of a plastic.

10. The apparatus of claim 1, wherein said first tab is directed away from said first end and toward said hinge means;

and wherein said second tab is directed toward said second end and away from said hinge means.

11. The apparatus of claim 1 wherein said hinge means comprises a groove disposed across said first side substantially perpendicular to a longitudinal axis of said planar member.

12. The apparatus of claim 1 wherein said hinge means comprises a living hinge molded into the planar member thereby making it resistent to fatigue failure.

13. A method of latching the ends of a folding drafting aid apparatus together wherein said drafting aid apparatus comprises a planar member having a first end and a second end and a first side and a second side, and being foldable at hinge means such that said second side pivots face to face against itself, a flexible first tab having a first free end and retained on a first tab structure directed away from said first end, and a flexible, resilient second tab having a second free end and retained on a second tab structure directed toward said second end, comprising the steps of:

folding said planar member at said hinge means until said second strip side is brought face to face against itself;

pressing one said tab against the other said tab;

bending both tabs thereby such that said first and second tab free ends both move in substantially the same direction; allowing the free end of said one tab to pass over the free end of the other said tab;

creating a cross-over of said tabs; and holding said planar member in the folded position by said cross over.

14. A method of latching the ends of a folding drafting aid apparatus together wherein said drafting aid apparatus comprises a planar member having a first end and a second end and a first side and a second side, and being foldable at hinge means such that said second side pivots face to face against itself, a flexible first tab having a first free end and retained on a first tab structure directed away from said first end, and a flexible, resilient second tab having a second free end and retained on a second tab structure directed toward said second end, comprising the steps of:

pressing one said tab against the other said tab;

bending both tabs thereby such that said first and second tab free ends both move in substantially the same direction;

allowing the free end of said one tab to pass over the free end of the other said tab to dispose the tabs in parallel relationship to each other;

eliminating the cross-over of said tabs thereby; and unfolding said planar member at said hinge means until the apparatus is in a substantially planar configuration.

* * * * *